United States Patent [19]
Timothy et al.

[11] Patent Number: 5,101,356
[45] Date of Patent: Mar. 31, 1992

[54] MOVING VEHICLE ATTITUDE MEASURING SYSTEM

[75] Inventors: La Mar K. Timothy, Kaysville; Michael L. Ownby, Sandy; Douglas G. Bowen, Spanish Fork, all of Utah

[73] Assignee: Unisys Corporation, Blue Bell, Pa.

[21] Appl. No.: 440,001

[22] Filed: Nov. 21, 1989

[51] Int. Cl.⁵ .......................................... G06F 15/50
[52] U.S. Cl. ................................... 364/449; 364/459; 342/352; 342/357
[58] Field of Search ...................... 364/449, 455, 459; 342/356, 357, 358, 352

[56] References Cited

U.S. PATENT DOCUMENTS

| | | | |
|---|---|---|---|
| 4,613,864 | 9/1986 | Hofgen | 364/449 |
| 4,751,512 | 6/1988 | Longaker | 342/357 |
| 4,754,280 | 6/1988 | Brown et al. | 342/357 |
| 4,812,991 | 3/1989 | Hatch | 364/449 |
| 4,894,655 | 1/1990 | Joguet et al. | 364/449 |
| 4,912,475 | 3/1990 | Counselman, III | 364/459 |

Primary Examiner—Gary Chin
Attorney, Agent, or Firm—John B. Sowell; Mark T. Starr

[57] ABSTRACT

A system for determining attitude of airborne vehicles or surface vehicles is provided with three fixed position antennas separated from each other by a predetermined calibrated distance. Each antenna is connected to a GPS receiver and the receiver outputs are coupled to a phase comparator which establishes the phase difference between the RF carrier signal of the three possible pairs of receivers. The outputs of the phase comparator are coupled to a preprogrammed dedicated processor that calculates a coordinate frame which fixes the attitude of the plurality of antennas in space. The processor then makes a comparison with a precalibrated reference attitude stored in an associated memory so that a true attitude value of roll, pitch and yaw may be calculated and employed to reposition the gyro of the moving vehicle.

6 Claims, 2 Drawing Sheets

1

MOVING VEHICLE ATTITUDE MEASURING SYSTEM

BACKGROUND OF THE INVENTION

1. Field of the Invention

This invention relates to attitude measuring systems. More particularly, the present invention system is adapted to supply the same correction information to a satellite attitude measuring system as is presently supplied by a star tracking system and/or a horizon and sun measuring system.

2. Description of the Prior Art

Attitude measuring systems for determining roll, pitch and yaw (RPY or $\theta$ RPY) are known and used in satellites and on aircraft to determine RPY of moving platforms. Heretofore, such moving platforms have included on board a gyro attitude package which comprises three gyros, one each for roll, pitch and yaw.

Before an aircraft takes off its gyro attitude system is calibrated and is not corrected during flight. Gyros are subject to drift and must be updated or recalibrated, accordingly, there is provided in every satellite system some type of gyro correction system. The most common calibration systems are star tracking systems that produce RPY information based on the position of known stars and horizon and sun systems which employ sun direction and horizon position information. Both of these correction systems are presently used system which employed telescopes mounted on movable gimble platforms which are accompanied with the proper control and positioning structure.

When extremely accurate attitude position is required, there is no substitute for the accuracy of a star tracking system. However, ninety percent of all the satellites that are launched do not require the accuracy of a star tracking system which is known to cost up to $1 million for each package. It would be extremely desirable to provide an attitude measuring system which is more accurate than the known horizon and sun attitude measuring system yet costs less.

SUMMARY OF THE INVENTION

It is a principal object of the present invention to provide an inexpensive and accurate attitude determination system.

It is another principal object of the present invention to provide an inexpensive system for measuring roll, pitch and yaw in a moving vehicle.

It is another principal object of the present invention to provide an accurate attitude determination system which is more accurate and less expensive than presently available horizon and sun sensing systems used in satellites.

It is another principal object of the present invention to provide an attitude determination for moving satellites which employ data regularly transmitted from global positioning system satellites.

It is another general object of the present invention to provide an attitude determination system which is lighter and more reliable and has no moving parts and is more accurate than horizon and sun sensing systems.

It is another general object of the present invention to provide a system for measuring roll, pitch and yaw which may be used in ground vehicles and ships.

According to these and other objects of the present invention, there is provided a novel attitude determination system which employs three fixed position antennas separated from each other by a calibrated distance. Each of the antennas is connected to a GPS receiver and their outputs are coupled to a phase comparator for establishing the phase difference of the RF carrier signal from the GPS system. The output of the phase comparator is fed into a dedicated processor which is pre-programmed to calculate a coordinate frame which fixes the attitude of the plurality of antennas in space and makes a comparison with a precalibrated reference attitude stored in memory means associated with the processor so that a true attitude value $\theta$ RPY may be calculated and applied as an output to the gyro bias calibrating system of a moving vehicle.

DESCRIPTION OF A PREFERRED EMBODIMENT

Figure 1:
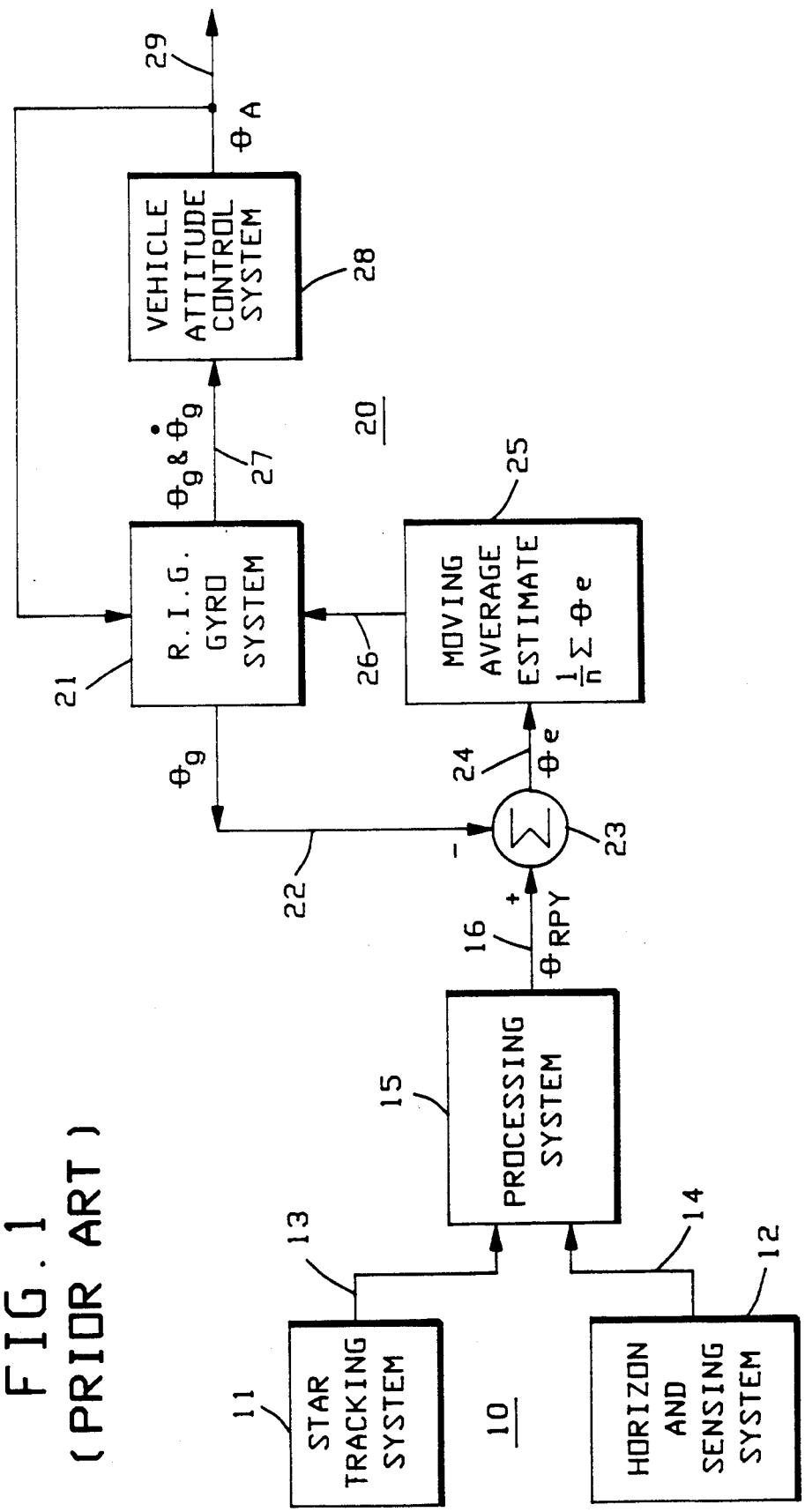
FIG. 1 is a simplified block diagram showing a prior art attitude sensing system coupled to a known type of gyro attitude system.

Refer now to FIG. 1 showing a prior art attitude sensing system 10 which comprises a star tracking system 11 and a horizon and sun sensing system 12 which produce RPY angle information, azimuth and elevation angles on line 13 and 14 to processing system 15 which uses this information to produce the RPY attitude on line 16.

In order for processing system 15 to produce the RPY information on line 16, it is necessary to employ star catalog information as well as horizon and sun catalog information. This catalog information is calibrated on the ground before the vehicle is launched and remains as a fixed catalog of parameters.

FIG. 1 also shows a known type gyro attitude system 20 which comprises a rate integrating gyro system 21 (R.I.G.) which produces the gyro attitude output $\theta g$ on line 22 which is applied to a summing circuit 23. The output of the summing circuit is an instantaneous attitude error signal on line 24 which is applied to a moving average estimate circuit 25 which takes the instantaneous $\theta e$ attitude error signals and averages them over a large number of such error input signals. The output of estimating circuit 25 on line 26 is thus a more accurate $\theta e$ value refined by employing a plurality of instantaneous $\theta e$ signals. The average value on line 26 is applied to the gyro bias torque motors (not shown) which permit correction of the gyro system 21. Thus, the gyro attitude system 20 is continuously being corrected so as to produce a most recently corrected output signal on line 27 indicative of the latest attitude value $\theta g$ and $\dot\theta g$ where the term $\dot\theta g$ is indicative of the gyro attitude rate which dampens the motion of the gyro system 21. This corrected signal on line 27 is the signal that is used by the vehicle attitude control system 28 for maintaining required attitudes in the vehicle. The value of the actual attitude of the vehicle is supplied on line 29 as a $\theta A$ signal and this signal may be employed as a feedback signal to the rate integration gyro system 21.

For explanation purposes the two attitude sensing systems 11 and 12 have been explained together, however, when extreme accuracy is not required the more expensive star tracking system may be eliminated. Conversely, when extreme accuracy is required the star tracking system is always required and the horizon and sun sensing system as a backup is optional.

Figure 2:
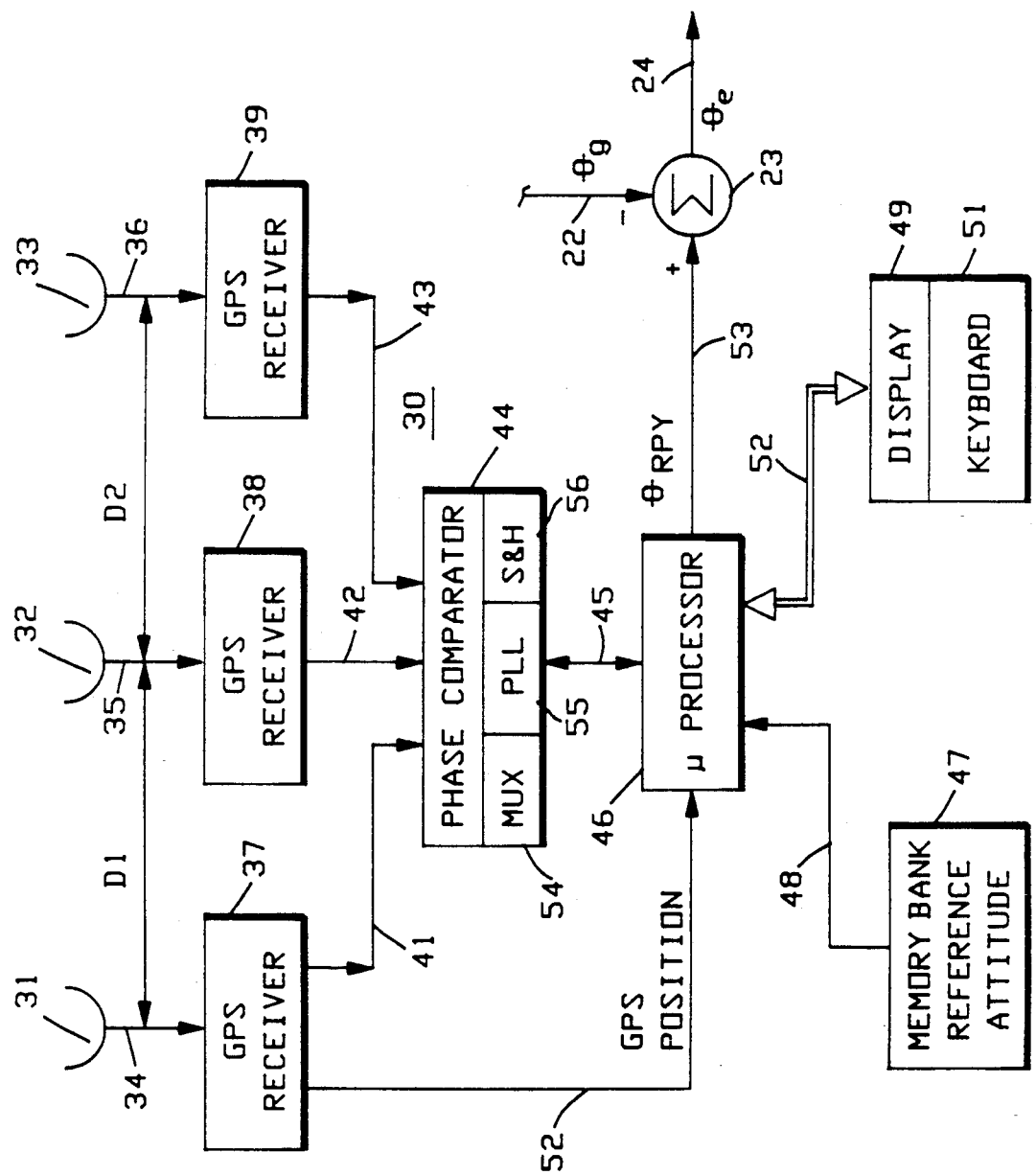
FIG. 2 is a simplified block diagram of the present invention attitude sensing system which may be used in conjunction with a gyro attitude system of the type shown in FIG. 1 or used alone.

Refer now to FIG. 2 showing a simplified block diagram of the present invention attitude sensing system of the type which may be employed with the known gyro attitude system 20 shown in FIG. 1 or may be used alone. The attitude sensing system 30 is shown comprising three GPS type antennas, 31 to 33 shown separated from each other by precalibrated known distances D1 and D2. The outputs of the GPS type antennas on lines 34 to 36 are applied to known type GPS receivers 37 to 39. The output of the GPS receivers 37 to 39 are adapted to simultaneously supply the output RF carrier signal from the GPS satellite information. The RF carrier signal on lines 41 to 43 is supplied to a phase comparator which includes means for determining the phase angle between the 3 possible pairs of receivers 37,38 and 38,39 and 39,37. The phase comparator 44 further includes a multiplexer 54 for selecting simultaneously pairs of signals which are applied to accurate phase lock loops 55 to produce analog error signals indicative of the phase between the different pairs of received signals. Phase comparator 44 further includes a sample and hold circuit 56 which converts the analog information to digital format and holds the sample for presentation on line 45 to the microprocessor 46. In the preferred embodiment of the present invention, a dedicated microprocessor 46 is employed in conjunction with a dedicated memory bank reference attitude storage system 47 which is coupled via bus 48 to the micro processor. In large satellite systems which are already designed and being manufactured with on board processors, it is possible to provide a dedicated program for use with the same input information. This would enable the on board processor to make the same computations as those made by the micro processor 46. The display 49 is not required in a fast moving satellite or airborne vehicle. The keyboard 51 is always necessary for airborne vehicles which employ the display 49 and may be used for calibration purposes before launching a satellite vehicle and then disconnected from the micro processor and it's bus 52 before launching the vehicle. The Display 49, keyboard 51 and cable 52 may be considered ground support equipment for satellites launched in orbit.

Memory bank 47 contains ground calibration data as well as the latest precalibrated reference information indicative of the position of a reference satellite and its reference attitude. By employing the precalibrated reference information in memory bank 47 it is possible to interpret the phase information on line 45 in micro processor 46 with program means and produce the desired attitude information $\theta$ RPY on line 53. The only other information that is necessary to make this accurate attitude calculation is the polar coordinate vector direction to the GPS satellite which is supplying the R.F. carrier information to antennas 31 to 33. This information is being broadcast by the GPS satellite and any one of the three GPS receivers 37 to 39 may be employed to feed this polar coordinate information to the microprocessor 46 via line 52 to enable the micro processor 46 to make the accurate attitude computation of $\theta$ RPY which is supplied as a digital signal on line 47 to the sum and difference device 23. Device 23 is also shown in FIG. 1 as having a $\theta g$ input on line 22 and $\theta e$ output on line 24. Thus, it will be understood that the present invention may be employed in conjunction with a gyro attitude system 20 of the type shown in FIG. 1 or may be employed in a stand alone system such as a ship or ground vehicle where the signal on line 47 would be applied to a utilization device.

Having explained a preferred embodiment of the present invention it will now be understood that over 90% of the satellites which require sensing systems with accuracy greater than that which is available from the presently available horizon and sun sensing systems can be provided by the present invention without having to employ the more expensive star tracking system. For example, a star tracking system is capable of producing attitude information to an accuracy of 2 to 10 arc seconds or 0.0005520 to 0.003 degrees. In contrast thereto the more inexpensive horizon and sun sensing systems are only accurate to about 0.1 degrees. The present invention system has been calculated to be able to produce attitude information to an accuracy of 0.01 degrees by repetitive averaging when an accuracy of this magnitude is required.

Having explained a preferred embodiment of the present invention employing three antennas and three receivers it was explained that the novel attitude measuring or sensing system could be used in a stand alone environment. It is possible to employ the present invention in stationary vehicles on the ground or moving vehicles on the ground for accurately determining azimuth directions. Such information can be employed by a surveyors, artillery personnel and for accurately sighting antennas.

What is claimed is:

1. An attitude measuring system for a moving vehicle, comprising:
   a plurality of fixed position antennas in said moving vehicle separated from each other by a known calibrated distance,
   a GPS receiver coupled to each of said fixed position antennas,
   each said GPS receiver adapted to receive the same GPS signals from a corresponding GSP satellite and simultaneously produce an output RF carrier signal,
   a phase comparator coupled to the individual RF carrier signal outputs from said receivers for comparing the RF carrier phase difference, between any two of said receivers and for producing digital phase difference signals based on the comparison,
   processor means coupled to said phase comparator for receiving said digital phase difference signals indicative of the line of sight pointing angles to the GPS satellite having a calculable known position,
   memory means coupled to said processor means and containing the latest pre-calibrated reference attitude information of the moving vehicle's attitude, and
   means in said processor means for calculating a coordinate frame for determining the attitude of said plurality of antennas in space and for making a comparison with said pre-calibrated reference attitude information and for producing a true attitude value ($\theta$ RPY) output signal based on said comparison and said digital phase difference signals to be applied as an input to a gyro bias calibration system or employed as a stand alone attitude signal.

2. An attitude measuring system as set forth in claim 1 wherein the calibrated distance between said antennas is comprises said pre-calibrated reference attitude information stored in said memory means.

3. An attitude measuring system as set forth in claim 1 wherein said moving vehicle is a high speed airborne platform and said plurality of said antennas comprises three antennas connected to the three GPS receivers.

4. An attitude measuring system as set forth in claim 3 wherein said phase comparator comprises multiplexer means for rapidly sequencing and sampling GPS signal information from said three receivers.

5. An attitude measuring system as set forth in claim 4 wherein said phase comparator further includes three accurate electronic phase lock loops coupled to said multiplexer for coupling each possible combination of pairs of three antennas for providing three sets of analog error signals.

6. An attitude measuring system as set forth in claim 5 wherein said phase comparator further includes a sample and hold means for converting said analog sets of error signals into said digital phase difference signals individually coupled to said processor means.